United States Patent
Kudara et al.

(10) Patent No.: US 7,219,355 B2
(45) Date of Patent: May 15, 2007

(54) OPTICAL DISK REPRODUCING APPARATUS

(75) Inventors: Makoto Kudara, Shirakawa (JP); Kiyoshi Kobiyama, Shirakawa (JP)

(73) Assignee: D&M Holdings Inc., Kanagawa (JP)

( * ) Notice: Subject to any disclaimer, the term of this patent is extended or adjusted under 35 U.S.C. 154(b) by 101 days.

(21) Appl. No.: 10/383,429

(22) Filed: Mar. 7, 2003

(65) Prior Publication Data
US 2003/0231571 A1 Dec. 18, 2003

(30) Foreign Application Priority Data
Jun. 18, 2002 (JP) .............................. 2002-176716

(51) Int. Cl.
*G11B 17/04* (2006.01)
*G11B 15/675* (2006.01)

(52) U.S. Cl. ...................................... 720/626; 720/634
(58) Field of Classification Search ................. 720/626
See application file for complete search history.

(56) References Cited

U.S. PATENT DOCUMENTS 4,601,026 A * 7/1986 Kawakami ............... 369/30.85
5,047,881 A * 9/1991 Uehara ..................... 360/99.05
5,555,227 A * 9/1996 Kurosu .................... 369/30.96
5,864,522 A * 1/1999 Sugano et al. ........... 369/30.29

FOREIGN PATENT DOCUMENTS

JP          5-189846           7/1993

* cited by examiner

*Primary Examiner*—Brian E. Miller
(74) *Attorney, Agent, or Firm*—Koda & Androlia

(57) ABSTRACT

An optical disk player including: a disk insertion assembly which is positioned on an upper portion of the front face of the player main body and has a disk insertion/ejection opening into which an optical disk is inserted, a disk conveying device which holds the inserted optical disk and is moved in a forward-rearward direction of the player main body so as to convey the optical disk to a disk reproducing device, a moving device which moves the disk conveying device in a vertical direction of the player main body, a disk recognition device that determines whether or not an optical disk is being held in the disk conveying device, and a controller device that controls an operation timing of the disk insertion assembly and the disk conveying device by disk recognition signals supplied from the disk recognition device.

2 Claims, 12 Drawing Sheets

OPTICAL DISK REPRODUCING APPARATUS

OPTICAL DISK REPRODUCING APPARATUS

BACKGROUND OF THE INVENTION

1. Field of the Invention

The present invention relates to an upright type optical disk reproducing apparatus.

2. Prior Art

Recently, among optical disk reproducing apparatuses that reproduce (or playback) disks such as CDs (compact disks), DVDs (digital versatile disks), etc., an upright optical disk reproducing apparatus have become popular in view of the demands for a reduction in the thickness, savings of spaces, and its improved exterior appearance characteristics. In an upright optical disk reproducing apparatus, the recording surface of the disk is set perpendicular to the surface on which the optical disk reproducing apparatus is installed.

FIG. 11 show a typical upright optical disk reproducing apparatus. In this optical disk reproducing apparatus, optical disks are inserted via an optical disk insertion/ejection opening formed in the upper surface of the apparatus main body. An optical disk that is inserted via the optical disk insertion/ejection opening is conveyed to a turntable by a disk holder that moves in the vertical direction, and then the optical disk that is chucked on the turntable is conveyed back to the optical disk insertion/ejection opening by the disk holder.

As seen from the above, in the disk loading system of the conventional upright optical disk reproducing apparatus, an optical disk is held by a disk holder that moves in the vertical direction, and such an optical disk is conveyed from the optical disk insertion/ejection opening to the turntable position and then conveyed back from the turntable position to the optical disk insertion/ejection opening.

Furthermore, in such an upright optical disk reproducing apparatus, the optical disk insertion/ejection opening is opened only when an optical disk is being inserted and removed; and it is closed during playback and when the apparatus is not in use. This is to prevent dust from entering the main body via the optical disk insertion/ejection opening formed in the upper surface.

In the meantime, Japanese Patent Application Laid-Open (Kokai) No. H05-189846 discloses a cassette tape recorder. This cassette tape recorder has a cassette cover that opens and closes on the front face and has also a mechanism that opens the cassette cover toward the front of the main body about a shaft disposed in the main body. When a cassette tape is to be inserted, the cassette cover is opened, and the cassette tape is inserted into the main body. The cassette tape drops to a position where the cassette tape is held in a cassette tape holding member formed on the back of the cassette cover. When the cassette tape is to be removed, the user holds both side surfaces of the cassette tape set in the cassette tape holding member, and the cassette tape is pulled out.

When this front-loading mechanism is applied to an optical disk reproducing apparatus, it is necessary to increase the opening angle of the cover so that the user's fingers for holding the optical disk can enter into the opened space easily when an optical disk is inserted and removed. However, if the opening angle of the cover is large, dust tends to enter the interior of the apparatus, causing various problems.

The applicant of the present application has filed a patent application for an optical disk reproducing apparatus of the type shown in FIGS. 12 and 13 (U.S. patent application Ser. No. 10/229,531).

As seen from FIG. 13, in this optical disk reproducing apparatus, an optical disk insertion means into which an optical disk is inserted is provided in the front face of the apparatus main body so as to fold over in the forward direction (as shown by a curved arrow) about the axis of point P that is located in the lower portion, and an optical disk conveying means of a disk holder is provided so as to be moved up and down (as shown by a straight arrow) with the optical disk insertion means inclined.

When an optical disk is to be inserted, the optical disk insertion means folds over forward about the axis of point P, and the disk holder is moved upward with the optical disk insertion means kept inclined. When an optical disk is inserted through the disk insertion/ejection opening by the user into the disk holder, the disk holder is moved downward while holding the optical disk. When the optical disk is to be removed, the optical disk insertion means folds over forward about the axis of point P, and the disk holder that holds the optical disk is moved upward. As a result, the optical disk is removed easily.

In the above optical disk reproducing apparatus, the disk insertion/ejection opening through which an optical disk is to be inserted and removed is opened when the optical disk insertion means folds over forward about the axis of point P. Immediately after the disk insertion/ejection opening is opened, the disk holder is positioned below; and the disk holder is moved upward after the disk insertion/ejection opening is opened. Accordingly, if an optical disk is inserted immediately after the disk insertion/ejection opening is opened, the optical disk is likely to be inserted before the disk conveying means have been moved upward. If an optical disk is inserted before the disk conveying means have not been moved upward yet, the disk holder cannot hold the optical disk; and there is a danger that the optical disk will drop into the optical disk reproducing apparatus, causing the optical disk reproducing apparatus to malfunction.

SUMMARY OF THE INVENTION

The present invention solves the problems described above.

The object of the present invention is to provide an optical disk reproducing apparatus that prevents an optical disk from falling inside the apparatus main body even if an optical disk is attempted to be inserted into the disk insertion/ejection opening immediately after the disk insertion/ejection opening of the apparatus that has no disk inside is opened.

The above object is accomplished by a unique structure of the present invention for an optical disk reproducing apparatus, and the unique structure is that the optical disk reproducing apparatus has a disk recognition means which determines the presence or absence of a disk inside the optical disk reproducing apparatus; and when it is detected that an optical disk is inside the optical disk reproducing apparatus, the disk holder is raised after the disk insertion/ejection opening is completely opened, so that the disk is ejected.

On the other hand, when it is detected that no optical disk is inside the optical disk reproducing apparatus, then the raising operation of the disk holder is started before the opening operation of the disk insertion/ejection opening or is started at more or less the same time, so that the raising operation of the disk holder is completed prior to or at the same timing as the opening of the disk insertion/ejection opening, so that a disk is ready to be inserted immediately after the disk insertion/ejection opening is opened.

In the present application, the term "disk insertion/ejection opening" refers to an opening that allows an optical disk to be inserted into the apparatus and taken out of the apparatus.

The term "forward-rearward direction" refers not only to a horizontal direction with respect to the upright direction of the upright optical disk reproducing apparatus, i.e., the front face direction of the apparatus but also to a rotational direction that includes factors of the rotation in the front face direction.

Also, the term "vertical direction" refers to the upright direction of the apparatus and a rotational direction that includes factors of the rotation in the upright direction.

DETAILED DESCRIPTION OF THE INVENTION

Embodiments of the present invention will be described below in detail with reference to the accompanying drawings.

Figure 1:
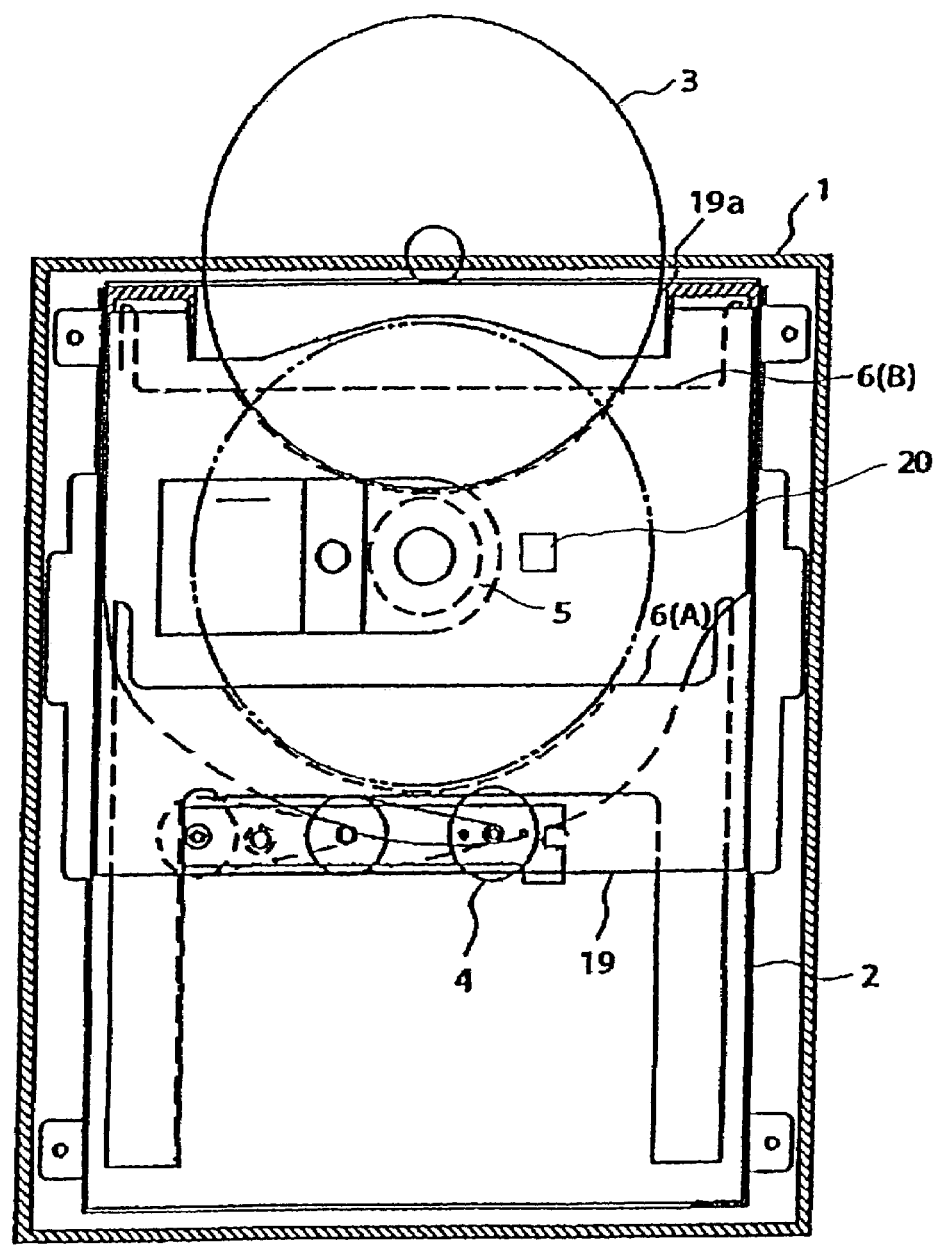
FIG. 1 is a front view of the schematic structure of one embodiment of the optical disk reproducing apparatus according to the present invention.

FIG. 1 shows the schematic structure of the loading mechanism of the optical disk reproducing apparatus of the present invention. FIG. 1 illustrates that an optical disk 3 has been inserted from above the apparatus by a disk insertion means, which includes a disk insertion/ejection opening, and has been conveyed to the reproduction (playback) position by a disk conveying means. The disk conveying means is operated in combination with the disk insertion means.

As seen from FIG. 1, the apparatus main body 1 of the optical disk reproducing apparatus includes therein a disk holder (or a disk conveying means) 6, a disk holder driving means 4, and a disk reproduction section 5.

The disk holder 6 that constitutes a disk conveying means conveys an optical disk 3 from the disk insertion/ejection opening 19a to the disk reproduction section 5 and sets the disk 3 in the disk reproduction section 5. The disk holder 6 also likewise conveys the optical disk 3 from the disk reproduction section 5 to the disk insertion/ejection opening 19a. The disk reproduction section 5 includes a disk pick-up, turntable, spindle motor, (not shown) etc. and reproduce (plays back) the optical disk 3. The disk holder driving means 4 (a moving means) drives the disk holder 6 so that the disk holder 6 is moved in the vertical direction. The disk holder 6 is moved in the vertical direction between the disk insertion position (upper portion in FIG. 1) and the disk reproduction position (lower part in FIG. 1) by the driving force of a disk holder motor of the disk holder driving means 4.

Figure 2:
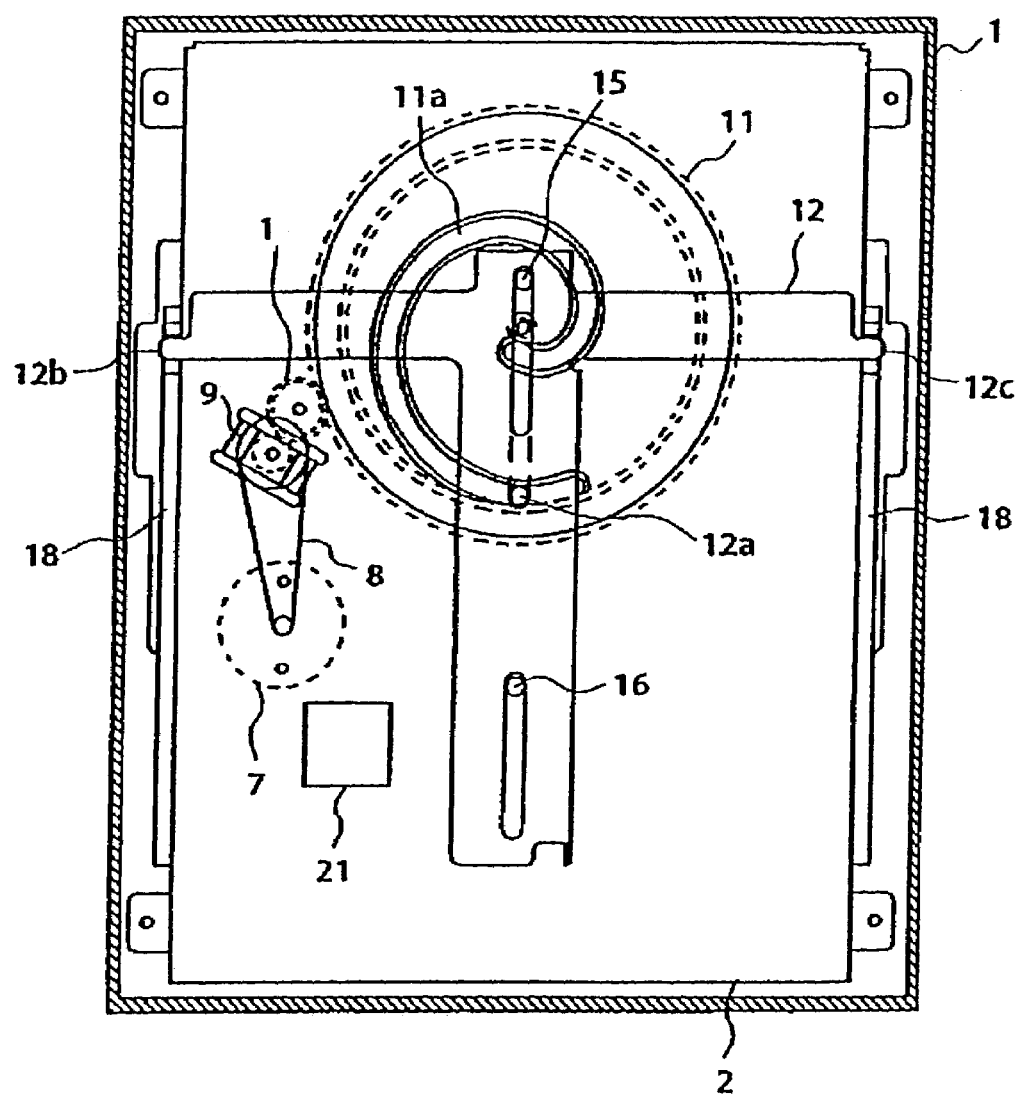
FIG. 2 is a rear view of the driving system of the optical disk reproducing apparatus of FIG. 1.

FIG. 2 shows the driving system of the moving means that moves the loading mechanism toward the disk reproduction section 5 (or toward the front of the apparatus main body 1). This driving system has a structure in which the rotation of a motor 7 (a motor for the disk insertion means) is transmitted to a cam gear 11 via a belt 8, pulley gear 9 and gear 10.

The reference numeral 12 is a slide plate. The slide plate 12 engages with guide pins 15 and 16 fastened to the chassis 2 of the apparatus main body 1 so that the slide plate 12 is free to slide. A shaft 12a fastened to the slide plate 12 engages with a cam groove 11a of the cam gear 11; and the slide plate 12 is caused to slide in the vertical direction along the guide pins 15 and 16 when the cam gear 11 is rotated.

Slide cams 18 are attached to both sides of the chassis 2 so that the slide cams 18 are slidable in the vertical direction. Both end portions 12b and 12c of the slide plate 12 respectively engage with the slide cams 18. Thus, when the slide plate 12 is moved in the vertical direction, the slide cams 18 are also moved in the vertical direction.

Figure 3:
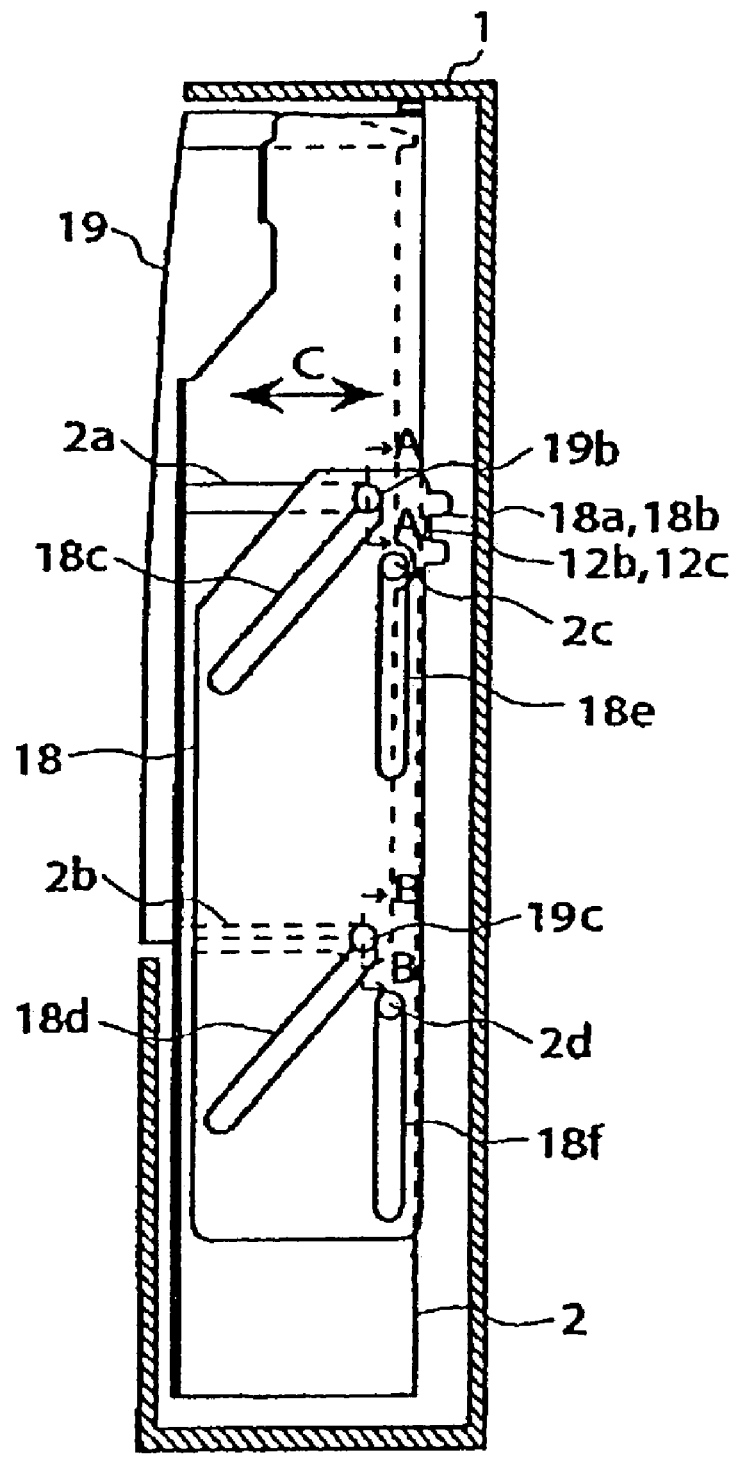
FIG. 3 is a side view showing the operation of the optical disk reproducing apparatus of the shown embodiment.
Figure 4:
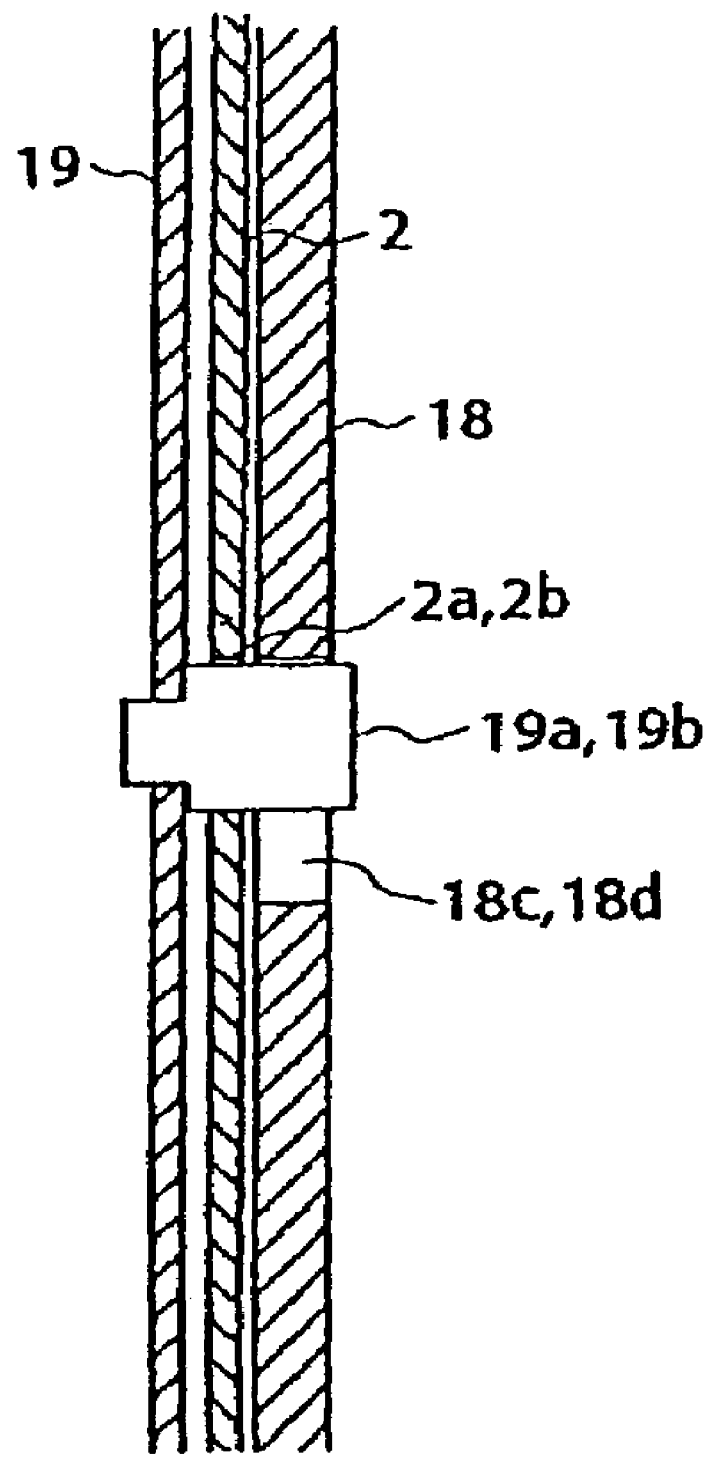
FIG. 4 is an enlarged sectional view of the essential portion in FIG. 3.

FIG. 3 is a side view that shows the schematic layout of the driving system of the moving means that moves the loading mechanism (equipped with the disk holder 6 and disk holder driving means 4) toward the optical disk reproduction section 5 (or toward the front face) by the vertical movement of the slide cams 18. FIG. 4 is an enlarged sectional view of the essential portion of the driving system. As seen from FIG. 3, guide pins 2c and 2d fastened to the chassis 2 engage with vertically oriented slots 18e and 18f formed in the slide cams 18, so that the slide cams 18 can move in the vertical direction. FIG. 4 is an enlarged sectional view of areas A and B in FIG. 3. Shafts 19b and 19c fastened to the side surfaces of a loader 19 pass through laterally oriented slots 2a and 2b formed in the chassis 2 and engages with slots 18c and 18d (that have an inclination) formed in the slide cams 18.

When the slide cams 18 are moved upward from the position of the slide cams 18 shown in FIG. 3, the shafts 19b and 19c are pushed by the slots 18c and 18d that have an inclination and guided by the laterally oriented slots 2a and 2b formed in the chassis 2. As a result, the loader 19 is moved toward the front of the apparatus main body 1. Conversely, when the slide cams 18 is moved downward form the upper position of this vertical movement, the loader 19 is moved toward the back of the apparatus main body 1. This front-back movement of the loader 19 is shown by arrow C in FIG. 3.

In FIG. 3, the slide cams 18 are at the lowermost position in the vertical movement. In this state, the disk holder 6 is in position A shown in FIG. 1, and the optical disk 3 is in a position in which the disk is chucked by the turntable 5. The loader 19 is in a closed state in the apparatus main body 1. In this state, the front face position of the loader 19 coincides (or is flush) with the front face position of the apparatus main body 1 as shown in FIG. 3. This is the state when disk reproduction (disk playback) is being performed or when the disk reproducing apparatus is not in use. When the disk reproducing apparatus is in use, the apparatus is operated by the operating buttons (not shown) or by a remote control (not shown), so that the loader 19 is opened and an optical disk is inserted or replaced.

The optical disk reproducing apparatus of the shown embodiment is equipped with a disk recognition means 20 that determines whether or not an optical disk 3 is being held in the disk holder 6. The disk recognition means 20 can be constructed by a photo-interrupter, and it comprises, as seen from FIG. 5, a light-emitting portion 20a, which is provided in the disk reproduction section 5 and emits infrared light, and a light-receiving portion 20b, which is provided on the interior surface of the loader 19 and receives the infrared light emitted from the light-emitting portion 20. The disk recognition means (photo-interrupter) 20 is disposed so that in cases where no optical disk is held in the disk holder 6, the infrared light emitted from the light-emitting portion 20a is received by the light-receiving portion 20b and so that in cases where an optical disk 3 is held in the disk holder 6, the reception of the infrared light emitted from the light-emitting portion 20a by the light-receiving portion 20b is blocked by the optical disk 3. Thus, the disk recognition means (photo-interrupter) 20 determines whether or not an optical disk 3 is being held in the disk holder 6 according to whether or not the infrared light emitted from the light-emitting portion 20a is received by the light-receiving portion 20b. The disk recognition means (photo-interrupter) 20 outputs a detection signal that indicates the detected results to the control circuit of a control means 21 (described later).

In the above, the light-emitting portion 20a and the light-receiving portion 20b of the disk recognition means 20 are provided so as to spacedly sandwich the optical disk 3 which is held in the disk holder 6. It is also possible to provide both light-emitting portion 20a and light-receiving portion 20b of the disk recognition means 20 inside the disk reproduction section 5 (or on the interior surface of the loader 19). In this structure, the disk recognition means 20 determines the presence of the disk held in the disk holder 6 when the light-receiving portion 20b receives the infrared light emitted from the light-emitting portion 20a and reflected by the surface of the disk 3 in the disk holder 6.

The optical disk reproducing apparatus is further equipped with a pulse signal generating means and a position detection means. The pulse signal generating means generates a pulse signal for each revolution of the motor 7. The position detection means detects whether or not the number of pulse signal generated by the pulse signal generating means has reached a predetermined value and detects the position of the disk insertion means (a loading mechanism) caused to move in the forward-rearward direction by the rotation of the motor 7. In cases where the disk insertion means is moved forward to the point where the disk insertion/ejection opening 19a through which the optical disk 3 is inserted and removed is opened, the position detection means outputs a detection signal, which indicates the detected results, to the control circuit.

Figure 5:
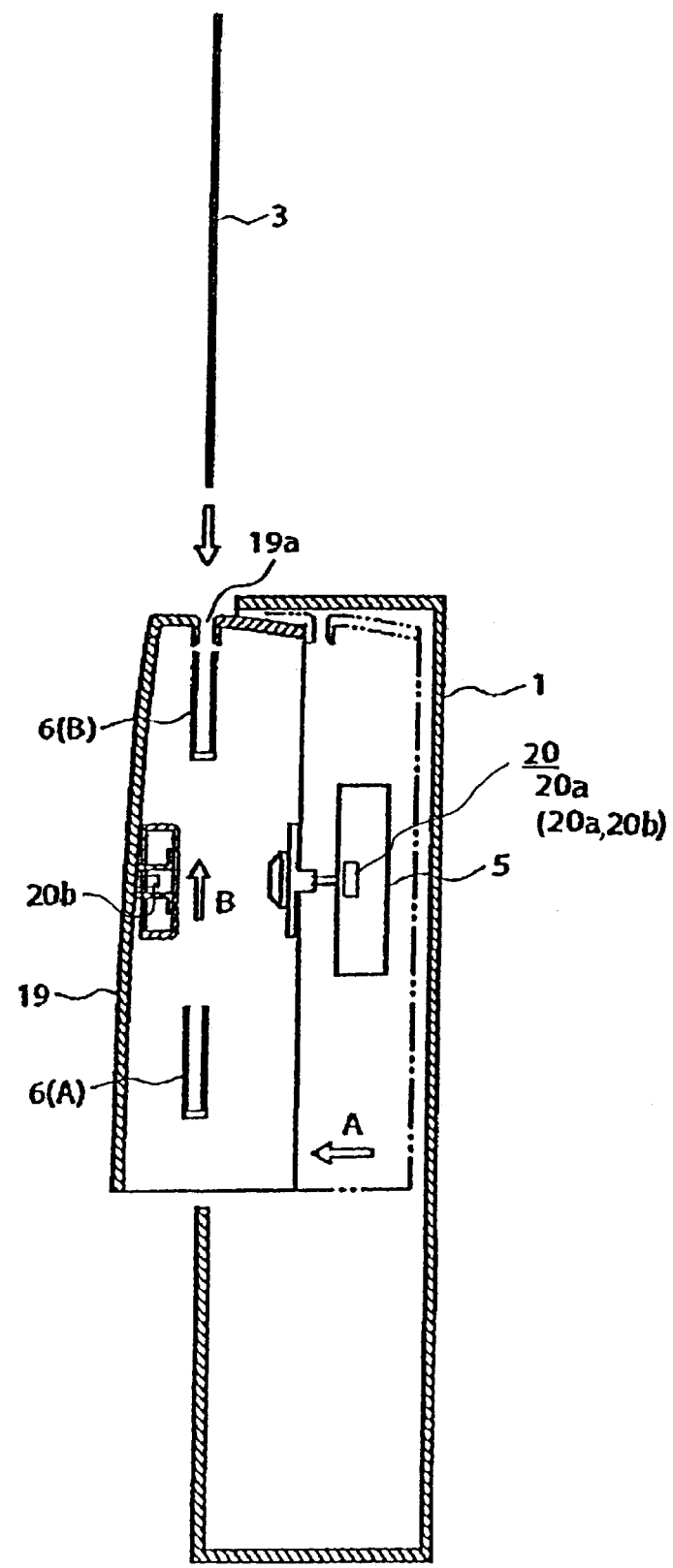
FIG. 5 is a side view that shows the operation of the optical disk reproducing apparatus with no disk inside.

FIG. 5 shows the disk loading operation for inserting an optical disk in the optical disk reproducing apparatus.

In FIG. 5, upon the opening operation (not shown), the disk recognition means 20 installed inside the apparatus determines the presence or absence of a disk. If the results indicate that no optical disk is present, the motor 7 and the disk holder driving means 4 are driven at substantially the same timing by the control circuit (not shown) installed in the apparatus main body 1, so that the loader 19 starts to be moved in the direction of arrow A, and the disk holder 6 starts to be moved in the direction of arrow B from position (A). Accordingly, the disk insertion/ejection opening 19a provided in the upper surface of the loader 19 is positioned so as to protrude forward beyond the front face of the upper portion of the apparatus main body 1, and the disk insertion/ejection opening 19a thus opens. At the same time, the movement of the disk holder 6 to position (B) is completed, and a state of ready for inserting the optical disk 3 is established. The loader 19 that has the disk insertion/ejection opening 19a forms a part of the disk insertion means.

Figure 6:
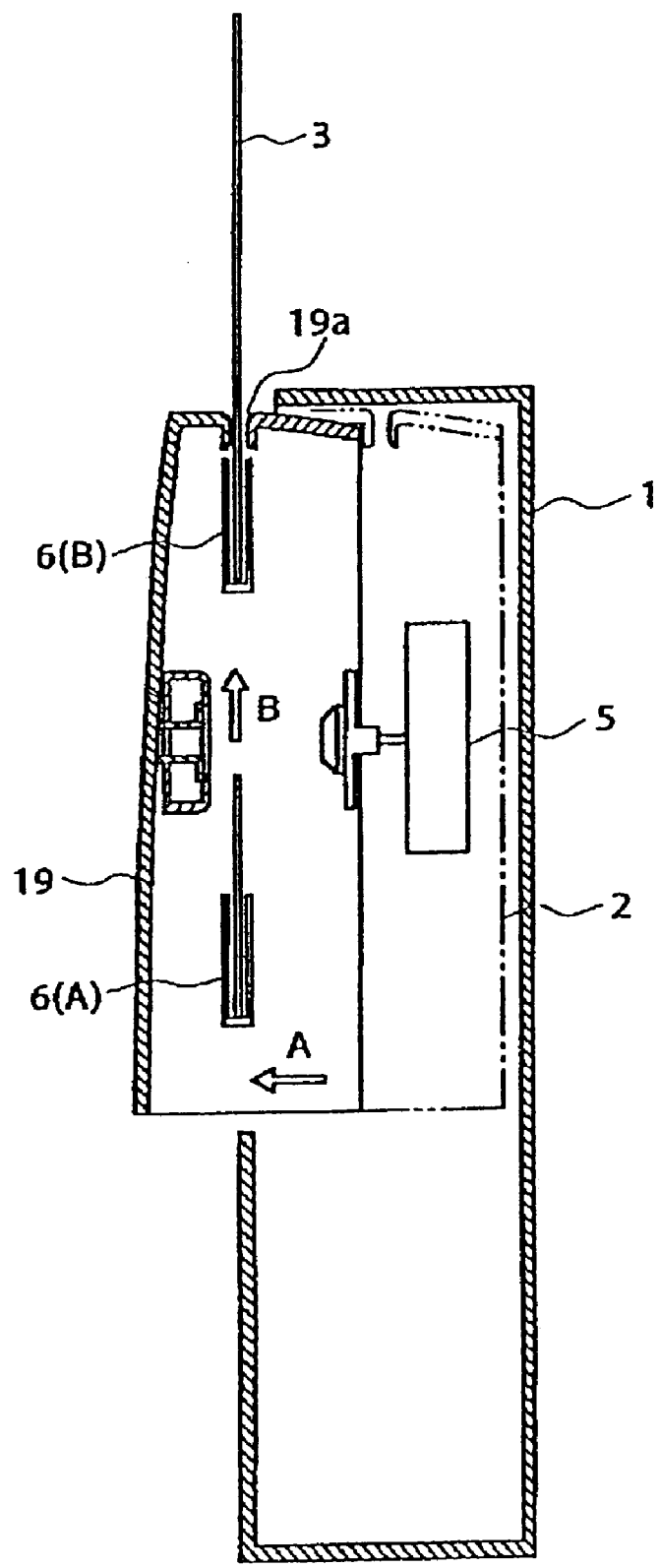
FIG. 6 is a side view that shows the operation of the optical disk reproducing apparatus with a disk inside.

FIG. 6 shows the disk unloading operation for ejecting the optical disk 3.

In FIG. 6, upon the opening operation (not shown), the disk recognition means 20 installed inside the apparatus main body 1 determines the presence or absence of a disk. If the results indicate that an optical disk 3 is present, the motor 7 is driven by the control circuit installed in the apparatus main body, and the loader 19 is as a result moved in the direction of arrow A. As a result, the disk insertion/ejection opening 19a in the upper surface of the loader 19 is positioned so as to protrude forward from the front face of the upper portion of the apparatus main body 1. After the disk insertion/ejection opening 19a has reached a completely open state, the disk holder driving means 4 which includes the disk holder motor is driven, so that the movement of the disk holder 6 in the direction of arrow B is initiated, and the optical disk 3 is ejected.

As seen from the above, in the shown embodiment, the optical disk reproducing apparatus is comprised of: a disk insertion means which is positioned in the upper portion of the front face of the apparatus main body 1 and has a disk insertion/ejection opening 19a, a disk conveying means which holds the optical disk 3 that has been inserted from the disk insertion means and moves in the forward-rearward direction of the apparatus main body 1 so as to convey the optical disk 3 to a disk reproducing (playback) means, and a moving means which moves the disk conveying means in the vertical direction of the apparatus main body; and the optical disk reproducing apparatus further includes: a disk recognition means 20 for determining whether or not an optical disk is being held in the disk conveying means, and a control means for controlling the operation timing of the disk insertion means and the disk conveying means by recognition signals supplied from the disk recognition means 20.

Figure 7:
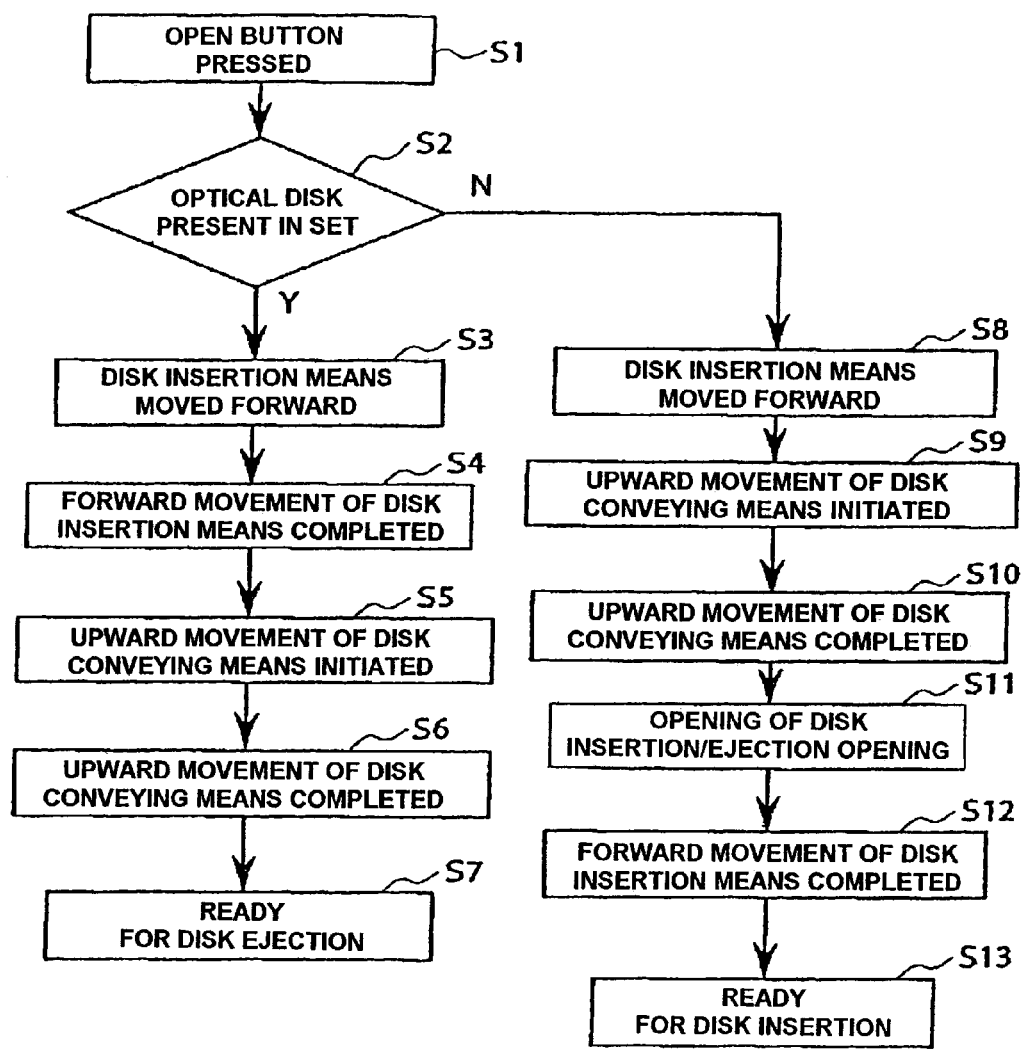
FIG. 7 is a flow chart of the operation of the optical disk reproducing apparatus.

FIG. 7, a flow chart, shows the operation of insertion and ejection of an optical disk. When ejecting or inserting an optical disk, the disk insertion means and the disk conveying means perform different operations depending upon whether or not an optical disk is inside the disk reproducing apparatus.

The OPEN button is first pressed (S1), and a judgment is made as to whether or not an optical disk 3 is inside the set, i.e., inside the reproducing apparatus.

In cases where this judgment is YES, steps S3 through S7 are performed; in cases where the judgment is NO, the operation of steps S8 through S13 is performed.

In the case of YES, the disk insertion means are moved in the forward direction (step S3), and when the forward movement of the disk insertion means is completed and stopped (step S4), the upward movement of the disk conveying means is initiated by the moving means (step S5). When the upward movement of the disk conveying means is completed and stopped (step S6), a state of ready for disk ejection is established (step S7).

In the case of NO, the disk insertion means starts to be moved forward (step S8); then, the disk conveying means starts to be moved upward (step S9). In this state, these two means are respectively moved in the forward direction and upward direction. The disk conveying means first completes its upward movement (step S10); in this state, the disk insertion/ejection opening reaches the open state with the forward movement of the disk insertion means (step S11). Then, the forward movement of the disk insertion means is completed (step S12), and a state of ready for disk insertion (step S13) is established.

Figure 8:
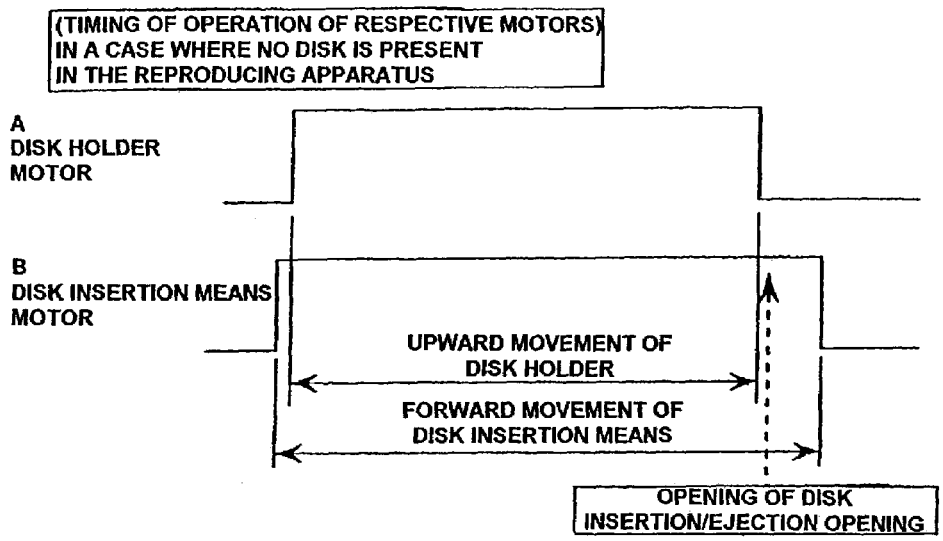
FIG. 8 is a timing chart of the operation in a case where no disk is inside the optical disk reproducing apparatus.
Figure 9:
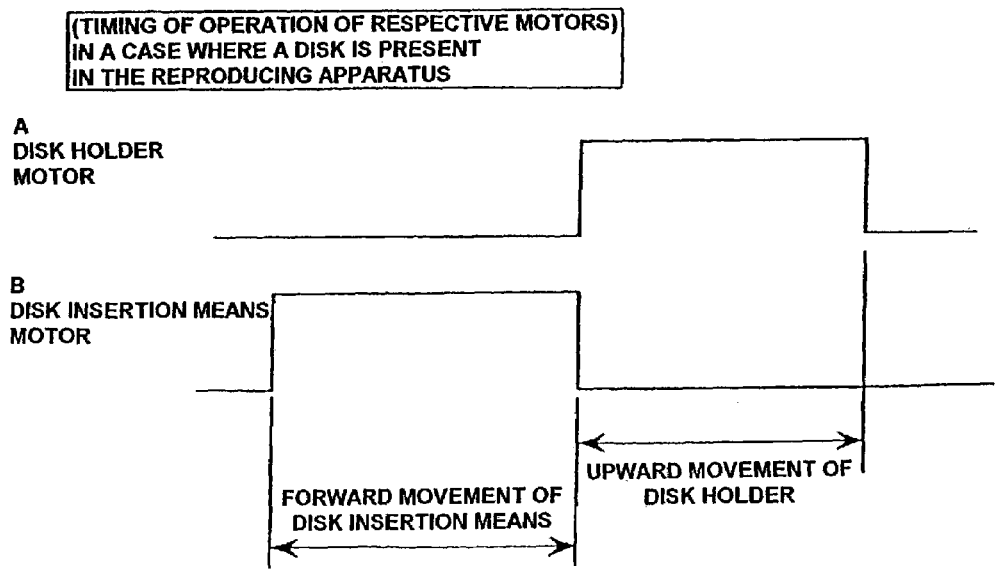
FIG. 9 is a timing chart of the operation in a case where a disk is inside the optical disk reproducing apparatus.

FIGS. 8 and 9 show the operation timing of the rotation and stopping of the rotation of the disk holder motor (of the disk holder driving means 4 that moves the disk holder 6) and the disk insertion means motor 7 (that moves the disk insertion means). FIG. 8 shows the timing of the rotation of the disk holder motor and disk insertion means motor 7 in a case where no optical disk is inside the disk reproducing apparatus, and FIG. 9 shows the timing of the rotation of the disk holder motor and disk insertion means motor 7 in a case where an optical disk 3 is inside the optical disk reproducing apparatus.

The control circuit controls the rotation of the disk holder motor that moves the disk holder 6 upward and downward and the rotation of the disk insertion means motor 7 that moves the disk insertion means forward and rearward based upon detection signals supplied from the disk recognition means and detection signals supplied from the position detection means that detects the position of the disk insertion means (or the loading mechanism).

As shown in the timing chart of FIG. 8, when the disk holder 6 holds no optical disk, the control circuit controls the disk holder motor and disk insertion means motor 7 so that the disk holder 6 is moved upward into the upper position prior to the opening of the disk insertion/ejection opening.

More specifically, the operation of the disk insertion means motor 7 is initiated, and immediately afterward (or at the same time), the operation of the disk holder motor is initiated, so that both motors are in operation. After the disk holder 6 is moved upward, the disk holder 6 stops, and the preparations for receiving an optical disk are completed. In this state, the disk insertion/ejection opening is opened by the forward movement of the disk insertion means, and then the disk insertion means stop.

Accordingly, the optical disk reproducing apparatus is comprise of: a disk insertion means that is positioned in the upper portion of the front face of the apparatus main body 1 and has a disk insertion/ejection opening 19a, a disk conveying means that holds the optical disk 3 inserted from the disk insertion means and is moved in the forward-rearward direction of the apparatus main body 1 so as to convey the optical disk 3 to a disk reproducing means, and a moving means that moves the disk conveying means in the vertical direction of the apparatus main body 1; and the optical disk reproducing apparatus further includes: a control means that delays the time at which the forward movement of the disk conveying means is stopped to a time that is later than the time at which the upward movement is stopped.

The optical disk reproducing apparatus is also comprised of: a disk insertion means that is positioned in the upper portion of the front face of the apparatus main body 1 and has a disk insertion/ejection opening 19a, a disk conveying means that holds the optical disk 3 inserted into the disk insertion means and is moved in the forward-rearward direction of the apparatus main body 1 so as to convey the optical disk 3 to a disk reproducing means, and a moving means that moves the disk conveying means in the vertical direction of the apparatus main body 1; and the optical disk reproducing apparatus further includes a control means that sets the time at which the disk insertion/ejection opening 19a of the disk insertion means is opened at a time that is the same as or later than the time at which the upward movement of the disk conveying means is stopped (including the time of stopping).

As seen from the timing chart of FIG. 9, in cases where the disk holder 6 is holding an optical disk 3, the control circuit controls the disk holder motor and the disk insertion means motor 7 so that the disk holder 6 is moved upward after the disk insertion means motor 7 is rotated and caused the disk insertion means to move forward so that the disk insertion/ejection opening opens.

Accordingly, the optical disk reproducing apparatus is comprised of: a disk insertion means that is positioned in the upper portion of the front face of the apparatus main body 1 and has a disk insertion/ejection opening 19a, a disk conveying means that holds the optical disk 3 inserted into the disk insertion means and is moved in the forward-rearward direction of the apparatus main body 1 so as to convey the optical disk 3 to a disk reproducing means, and a moving means that moves the disk conveying means in the vertical direction of the apparatus main body 1; and the optical disk reproducing apparatus further includes a control means. This control means sets the time at which the disk insertion/ejection opening of the disk insertion means opens at a time after the upward movement of the disk conveying means stops (including the time at which this upward movement stops) when it is judged that no optical disk is held in the disk conveying means, and it also sets the time at which the disk insertion/ejection opening of the disk insertion means opens at a time before the upward movement of the disk conveying means starts when it is judged that an optical disk is held in the disk conveying means.

The optical disk reproducing apparatus is also comprised of: a loader 19 (which is a disk insertion means) which is positioned in the upper portion of the front face of the apparatus main body 1 and has a disk insertion/ejection opening 19a, a disk conveying means which holds the optical disk that is inserted into the disk insertion means and is moved in the forward-rearward direction of the apparatus main body 1 so as to convey the optical disk 3 to a disk reproducing means, and slide cams 18 (a moving means) which cause the disk conveying means to move in the vertical direction of the apparatus main body 1; and the optical disk reproducing apparatus further includes a disk recognition means and a control means. The disk recognition means determines whether or not an optical disk is being held in the disk conveying means, and the control means separately controls the movement of the disk insertion means and the conveying means by disk recognition signals supplied from the disk recognition means.

Figure 10:
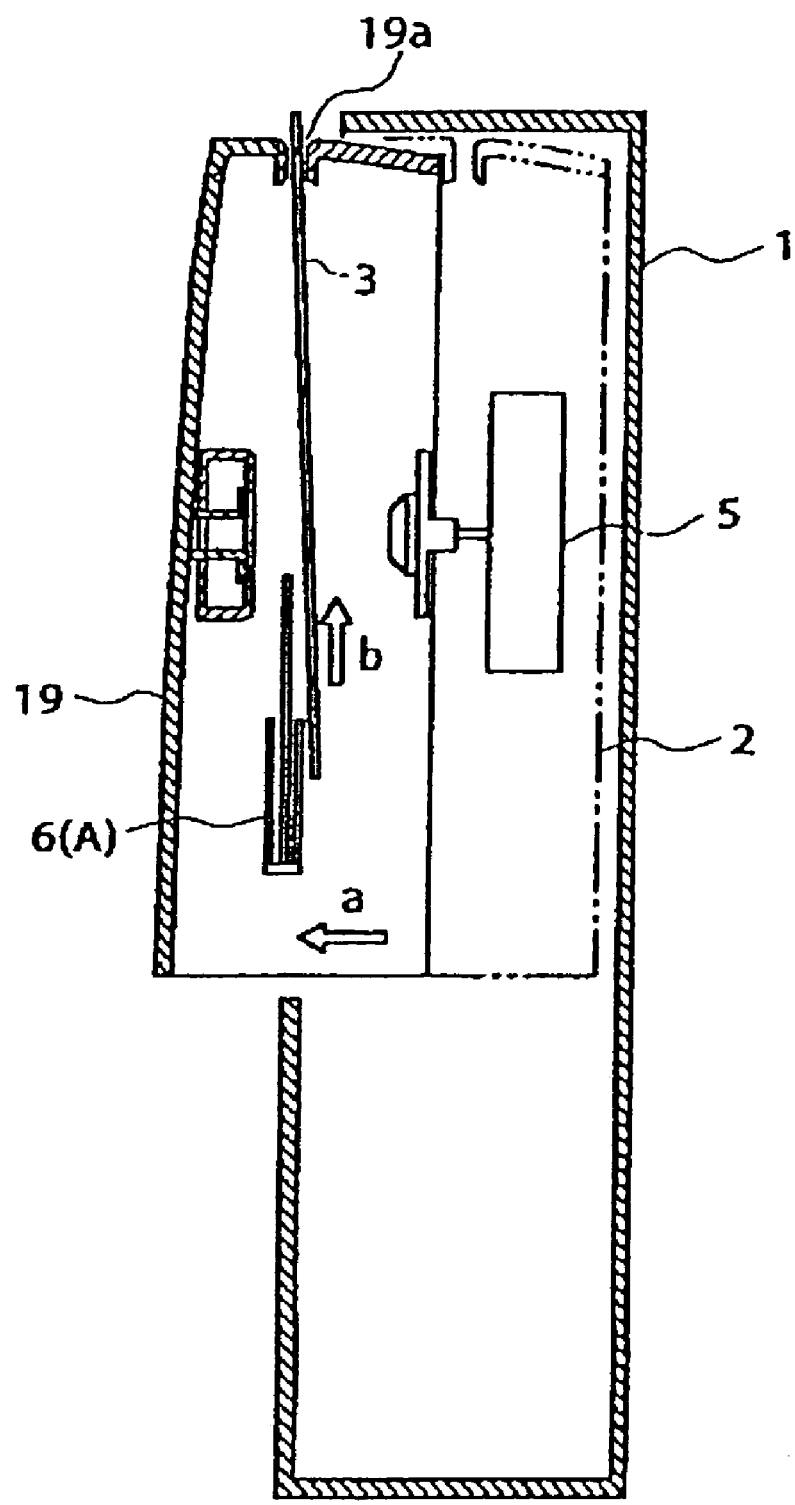
FIG. 10 shows an optical disk reproducing apparatus in malfunction, the apparatus not having the controlling structure of the present invention.
Figure 11:
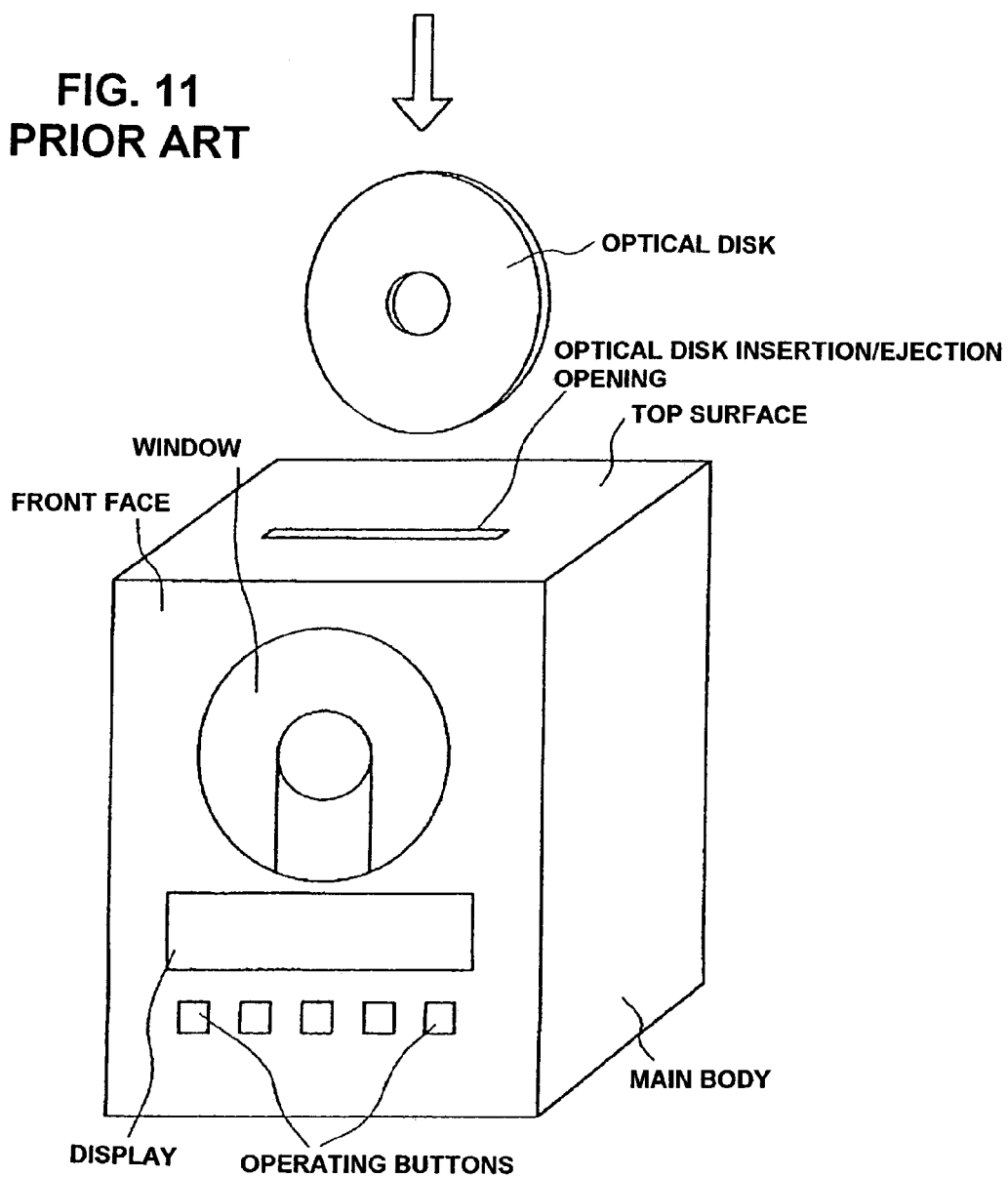
FIG. 11 shows a typical conventional optical disk reproducing apparatus.
Figure 12:
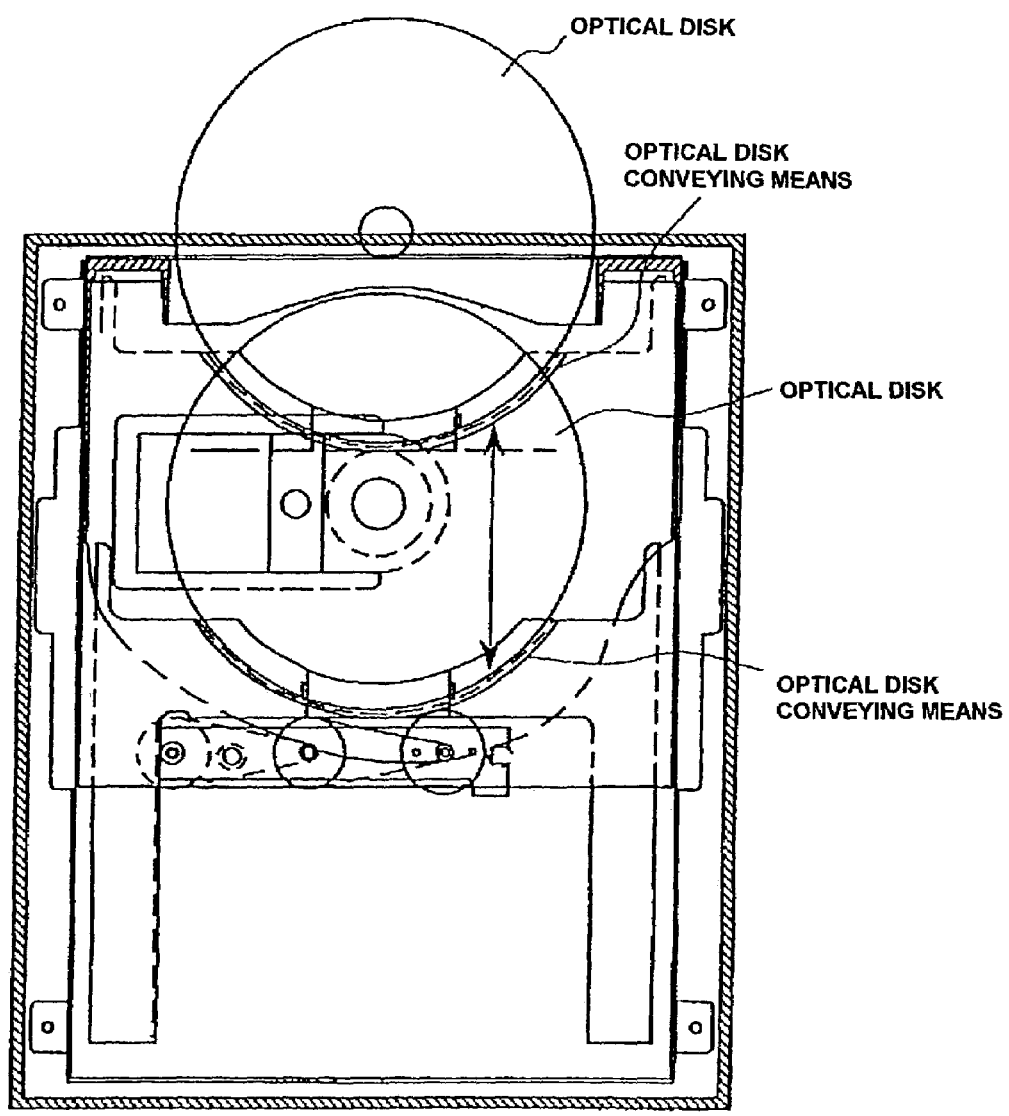
FIG. 12 shows the schematic structure of the conventional optical disk reproducing apparatus of FIG. 11.
Figure 13:
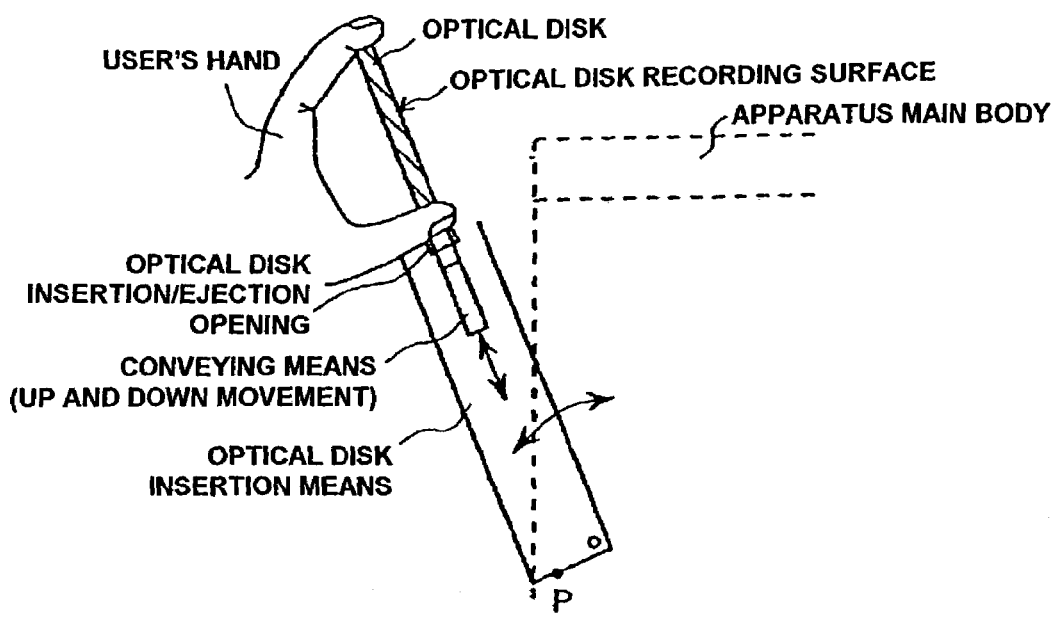
FIG. 13 shows the disk insertion/ejection operation in the conventional optical disk reproducing apparatus.

The above structures of the present invention prevents an optical disk from falling into the apparatus main body as shown in FIG. 10 that would happens when the disk is inserted before the upward movement of the disk conveying means is completed.

As seen from the above, according to the present invention, upon inserting an optical disk, the movement of a disk holder to the vicinity of the disk insertion/ejection opening formed in the upper portion of the optical disk reproducing apparatus is completed at the same time when the disk insertion/ejection opening opens (or before the disk insertion/ejection opening opens). Accordingly, a problem that a user erroneously drops an optical disk into the optical disk reproducing apparatus can be prevented.

The invention claimed is:

1. An upright optical disk reproducing apparatus equipped with a disk reproducing means for reproducing information recorded on an optical disk, said optical disk reproducing apparatus comprising:

an apparatus main body, a disk insertion means which is positioned on an upper portion of a front face of said apparatus main body and has an upwardly facing disk insertion/ejection opening, a disk holding means which holds said optical disk that is inserted into said disk insertion/ejection opening, a first moving means which moves said disk insertion means and said disk holding means in a forward and rearward direction of said apparatus main body, a second moving means which moves said disk holding means in an upward and downward direction of said apparatus main body, a disk recognition means for determining whether or not an optical disk is being held in said disk holding means, and a control means for separately controlling said first and second moving means in response to recognition signals supplied from said disk recognition means to said control means such that said disk insertion means and said disk holding means are moved forward by said first moving means before said disk holding means is moved upwardly by said second moving means when said recognition means determines that an optical disk is held by said disk holding means and said disk holding means is moved upwardly by said second moving means before said disk insertion means and said disk holding means are moved forward when said disk recognition means determines that an optical disk is not held by said disk holding means.

2. An upright optical disk reproducing apparatus equipped with a disk reproducing means for reproducing information recorded on an optical disk, said optical disk reproducing apparatus comprising:

an apparatus main body, a loader which is positioned on an upper portion of a front face of said apparatus main body and has an upwardly facing disk insertion/ejection opening, a disk conveying means which holds said optical disk that is inserted into said loader and moves in a forward-rearward direction of said apparatus main body and convey said optical disk to said disk reproducing means, and slide cams which cause said disk conveying means to move in a vertical direction of said apparatus main body;

said optical disk reproducing apparatus further comprising:

a disk recognition means for determining whether or not an optical disk is being held in said disk conveying means, and a control means for separately controlling a movement of said loader and a movement of said disk conveying means in response to recognition signals supplied from said disk recognition means to said control means such that said disk conveying means is moved forwardly before said disk conveying means is moved vertically upwardly by said slide cams when said disk recognition means determines that an optical disk is held by said disk holding means and said disk conveying means is moved upwardly by said slide cams before said disk insertion means is moved forwardly when said disk recognition means determines that an optical disk is not held by said disk conveying means.

* * * * *